(12) United States Patent
Johnson et al.

(10) Patent No.: US 11,629,043 B2
(45) Date of Patent: Apr. 18, 2023

(54) WARM PRODUCT DISPENSING

(71) Applicant: Pressco IP LLC, Cleveland, OH (US)

(72) Inventors: Benjamin D. Johnson, Northfield, OH (US); Jonathan M. Katz, Solon, OH (US); Don W. Cochran, Gates Mills, OH (US)

(73) Assignee: PTI IP LLC, Cleveland, OH (US)

( * ) Notice: Subject to any disclaimer, the term of this patent is extended or adjusted under 35 U.S.C. 154(b) by 1513 days.

(21) Appl. No.: 15/338,168

(22) Filed: Oct. 28, 2016

(65) Prior Publication Data
US 2017/0121167 A1 May 4, 2017

Related U.S. Application Data

(60) Provisional application No. 62/248,911, filed on Oct. 30, 2015.

(51) Int. Cl.
A47J 31/00 (2006.01)
A47J 31/46 (2006.01)
B67D 3/00 (2006.01)
A47J 36/24 (2006.01)
A47J 47/01 (2006.01)

(52) U.S. Cl.
CPC ........ B67D 3/0022 (2013.01); A47J 36/2488 (2013.01); A47J 47/01 (2013.01); B67D 3/0009 (2013.01); B67D 2210/00102 (2013.01); B67D 2210/00152 (2013.01)

(58) Field of Classification Search
None
See application file for complete search history.

(56) References Cited

U.S. PATENT DOCUMENTS

| 4,899,908 | A | 2/1990 | Kardiak |
| 5,968,390 | A * | 10/1999 | Lister .................... C11D 13/00 219/421 |
| 6,460,735 | B1 | 10/2002 | Greenwald et al. |
| 6,696,671 | B2 * | 2/2004 | Boehnke .............. B29B 13/022 219/388 |
| 8,448,566 | B2 | 5/2013 | Rezeki |
| 2009/0159611 | A1 | 6/2009 | Roetker et al. |
| 2009/0183637 | A1 | 7/2009 | Nijboer et al. |
| 2011/0002677 | A1 | 1/2011 | Cochran et al. |
| 2011/0067726 | A1 | 3/2011 | Cochran et al. |
| 2011/0163127 | A1 | 7/2011 | Debella-Lenaway |

(Continued)

OTHER PUBLICATIONS

International Search Report for PCT/US2016/059549 dated Jan. 10, 2017.

Primary Examiner — Joseph M. Pelham
(74) Attorney, Agent, or Firm — Lippes Mathias LLP

(57) ABSTRACT

A system is provided using targeted narrowband radiation emitting devices or arrays of devices that offers a solution to the difficulties surrounding heated product dispensing. Rather than maintaining an entire reservoir of product at a raised temperature, much smaller volumes (single portions or small multiples thereof) can be held ready and at temperature to be dispensed without wasting additional energy on keeping a large volume of product warm. This is achieved by leveraging the unique, targeted nature of these devices to quickly and accurately heat a small amount of product separated out from the main reservoir and held ready for dispensing.

29 Claims, 3 Drawing Sheets

(56) References Cited

U.S. PATENT DOCUMENTS

| | | | | |
|---|---|---|---|---|
| 2012/0063753 A1* | 3/2012 | Cochran | ................ | B65D 65/20 |
| | | | | 392/416 |
| 2012/0063754 A1* | 3/2012 | Nishida | ................... | F24H 1/162 |
| | | | | 392/424 |
| 2013/0202754 A1 | 8/2013 | Cochran et al. | | |

* cited by examiner

WARM PRODUCT DISPENSING

This application is based on and claims priority to U.S. Provisional Application No. 62/248,911, filed Oct. 30, 2015, which is incorporated herein by reference in its entirety.

BACKGROUND

There are myriad applications wherein a small volume of a material or foodstuff is portioned out of a larger volume for use or consumption. Dispensing product in this way allows for easy volume storage of a reservoir of material to serve repeated requests for individual smaller volumes of the same material. Examples include application of epoxy or adhesive in a manufacturing process, individual servings of beverages, shots of hand sanitizer or soap, and dispensing single servings of condiments or toppings.

In some cases it is advantageous or even required that the product to be dispensed be heated beforehand. This can be the case for either mechanical reasons (changing the material properties to facilitate easier dispensing) or for specific product quality reasons (providing warm toppings for foodstuffs). In the current state of the art, it is easiest to maintain a higher temperature throughout the entire volume of the material so that repeated requests for material can be met quickly and easily. This is achieved either through direct heating of the material in question or by storing the material in a higher temperature cavity. In either case, the raised temperature must be maintained for the entire volume on a constant basis.

While this approach is easiest from a technical stand point with existing technology, it has a number of draw backs. First, significant energy is required to constantly maintain the higher temperature of a large reservoir when only a small heated dispensing portion is required at any given time. Second, the product quality can suffer from long term time-at-temperature issues where the material or foodstuff could be adversely affected by long exposure to raised temperatures. Finally, holding a large volume of hot product, depending on the temperature and material, can be a safety hazard.

BRIEF SUMMARY

Figure 1:
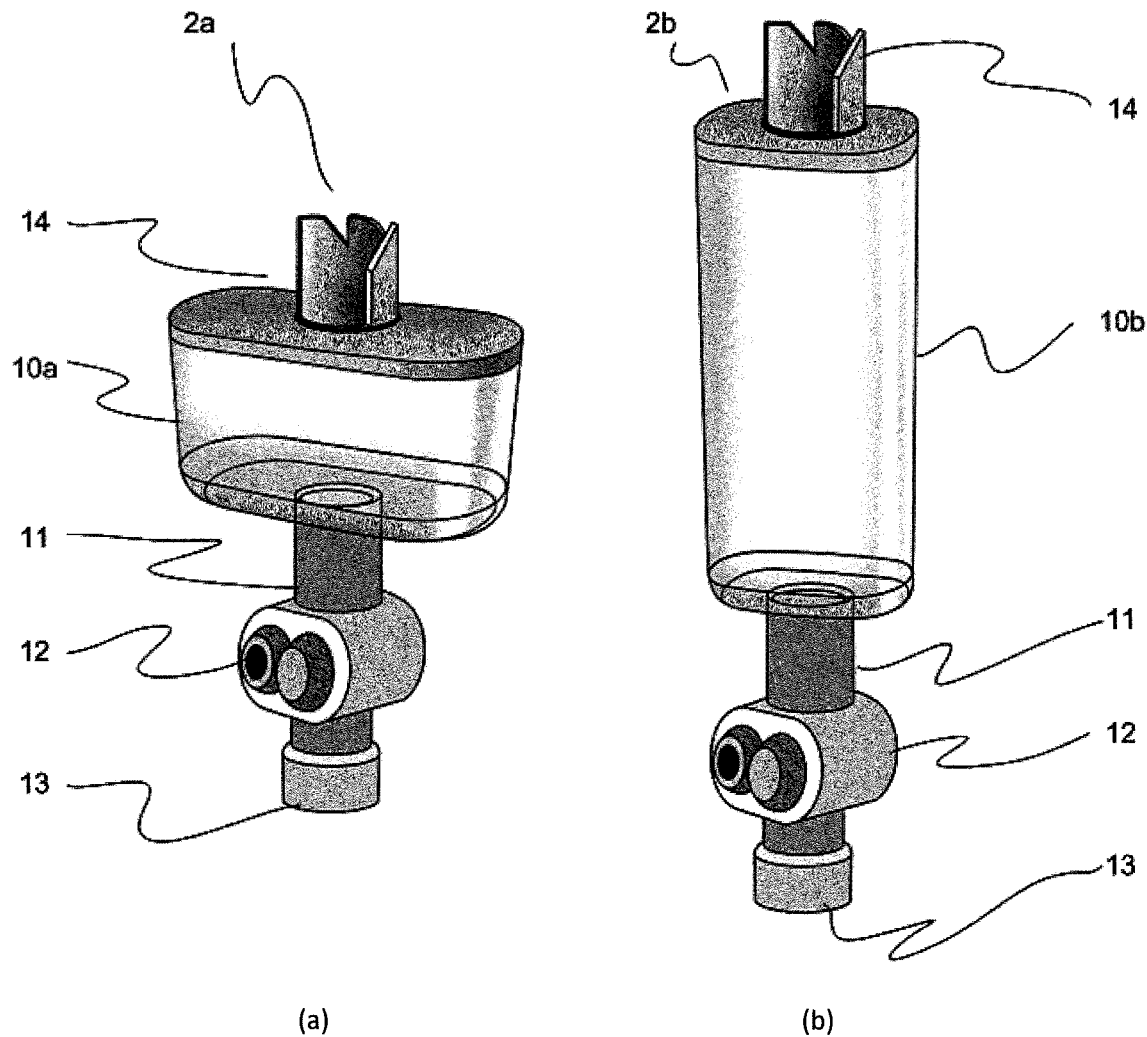
FIGS. 1(a) and 1(b) show example dispensing units according to the presently described embodiments.

In one aspect of the presently described embodiments, a warm product dispensing system using narrowband irradiation as a primary heating source, comprises a primary storage and supply reservoir for a dispensant, a secondary dispensing reservoir for the dispensant connected to the primary reservoir, the secondary reservoir having a smaller volume than the primary reservoir, narrowband irradiation devices or arrays of devices directed at the secondary reservoir and configured to emit irradiation at a narrow wavelength band that matches a desired absorption characteristic of the dispensant, wherein the secondary reservoir is formed of a material that is optically transmissive at the narrow wavelength band emitted toward the dispensant, and, a controller configured to control the system to heat the dispensant in the secondary reservoir.

In another aspect of the presently described embodiments, only the dispensant in the secondary reservoir is heated by emitted narrowband irradiation of the narrowband irradiation devices or arrays.

In another aspect of the presently described embodiments, the secondary reservoir includes an inlet and an outlet, wherein the inlet is larger than the outlet to allow flow of dispensant into the secondary reservoir from the primary reservoir.

In another aspect of the presently described embodiments, the system as set further comprises a cooling system configured to provide cooling function to the narrowband irradiation devices or arrays.

In another aspect of the presently described embodiments, the system further comprises sensors configured to provide information to the controller.

In another aspect of the presently described embodiments, the sensors comprise temperature sensors to detect temperature of the dispensant.

In another aspect of the presently described embodiments, the sensors comprise level sensors to detect a fill level of at least one of the secondary reservoir or the primary reservoir.

In another aspect of the presently described embodiments, the dispensant is a food stuff or a viscous food stuff.

In another aspect of the presently described embodiments, an interlock is used to ensure containment of irradiation.

In another aspect of the presently described embodiments, a heating and control system for use with a volume of dispensant in a primary reservoir and a secondary reservoir for dispensing, the system comprises narrowband irradiation devices or arrays of devices directed at the secondary reservoir and configured to emit irradiation at a narrow wavelength band that matches a desired absorption characteristic of the dispensant, wherein the secondary reservoir is formed of a material that is optically transmissive at the narrow wavelength band emitted toward the dispensant, a controller configured to control heating of the dispensant using emitted narrow wavelength band irradiation to, at least one of, monitor dispense cycles, trigger the narrowband irradiation devices or arrays of devices when unheated dispensant enters the secondary reservoir, and trigger the narrowband irradiation device or arrays of devices for holding purposes when no dispensing cycles have occurred for an amount of time.

In another aspect of the presently described embodiments, only the dispensant in the secondary reservoir is heated by emitted narrowband irradiation of the narrowband irradiation devices or arrays.

In another aspect of the presently described embodiments, the controller is configured to control a cooling system configured to provide cooling function to the narrowband irradiation devices or arrays.

In another aspect of the presently described embodiments, the system further comprises sensors configured to provide information to the controller.

In another aspect of the presently described embodiments, the sensors comprise temperature sensors to detect temperature of the dispensant.

In another aspect of the presently described embodiments, the sensors comprise level sensors to detect a fill level of at least one of the secondary reservoir or the primary reservoir.

In another aspect of the presently described embodiments, the dispensant is a food stuff or a viscous food stuff.

In another aspect of the presently described embodiments, a method to be used where a volume of dispensant is divided into a primary reservoir and a secondary reservoir for dispensing the method comprises supplying dispensant from the primary reservoir to the secondary reservoir, and, heating the volume of material in the secondary reservoir for dispensing by emitting from narrowband irradiation devices or arrays of devices irradiation at a narrow wavelength band that matches a desired absorption characteristic of the dispensant, wherein the secondary reservoir is formed of a material that is optically transmissive at the narrow wavelength band emitted toward the dispensant.

In another aspect of the presently described embodiments, wherein the heating is such that only the dispensant in the secondary reservoir is heated by emitted narrowband irradiation of the narrowband irradiation devices or arrays.

In another aspect of the presently described embodiments, the method further comprises controlling a cooling function of the narrowband irradiation devices or arrays.

In another aspect of the presently described embodiments, the method further comprises controlling based on sensors providing information to a controller.

In another aspect of the presently described embodiments, the sensors comprise temperature sensors to detect temperature of the dispensant.

In another aspect of the presently described embodiments, the sensors comprise level sensors to detect a fill level of at least one of the secondary reservoir or the primary reservoir.

In another aspect of the presently described embodiments, in the dispensant is a food stuff or a viscous food stuff.

DETAILED DESCRIPTION

A system using targeted narrowband radiation emitting devices or arrays of devices offers a solution to the difficulties surrounding heated product dispensing (such as dispensing of food stuff such as viscous food products or any other material such as viscous material that may be advantageously dispensed or have flow characteristics improved by a system according to the present application. Rather than maintaining an entire reservoir of product at a raised temperature, much smaller volumes (single portions or small multiples thereof) can be held ready and at temperature to be dispensed without wasting additional energy on keeping a large volume of product warm. The smaller volume of material can be heated to aid in the timely dispensing of the material. Rapid dispensing of heated material is achieved because dispensed material can be quickly replaced and heated. Also, in addition to heating the material to a desired temperature, a meaningful change of material properties, such as viscosity, may also be achieved to aid in the ability to dispense or improve flow of the material. This is achieved by leveraging the unique, targeted nature of these narrowband devices or arrays to quickly and accurately heat a small amount of product separated out from the main reservoir and held ready for dispensing. Using such radiant, narrowband heating (e.g. by primarily heating using, for example, optical narrowband irradiation), inefficient broadband conductive heating techniques are avoided. Further, by using targeted narrowband heating techniques contemplated herein, a system according to the presently described embodiments can heat the same liquid more precisely than conventional conductive liquid heating systems. In this regard, for example, thermostatically controlled systems that heat via conduction, and heat relatively large volumes of material with inherent control and system hysteresis, cannot control temperatures with the accuracy of the narrowband wavelength heating contemplated herein.

As shown in FIGS. 1(a) and 1 (b), a dispensing unit 2a or 2b, respectively, according to the presently described embodiments implements the use of a smaller, secondary and/or dispensing reservoir 10a or 10b, respectively, to allow applied thermal energy to remain in only the product about to be dispensed and also protects the larger reservoir such as a larger primary storage and supply reservoir (not shown) of product from any potentially negative thermal effects. Also shown in both systems 2a or 2b is a pump or valve 12 allowing flow of dispersant from tube 11 to outlet 13. The dispensing unit 2a (and 2b) is provided with an inlet tube 14 that is designed to protrude into the larger reservoir. The inlet tube 14 is shown representatively, and not necessarily to scale, inasmuch as, in at least one form, the inlet tube 14 is substantially larger in diameter than the outlet of the reservoir connected to the tube 11. The inlet could be, for example, multiple times larger than the outlet (e.g. 2, 3, 4, . . . 10 times larger). Such a configuration allows the material to flow more easily into the small reservoir 10a, 10b, before heating, from the storage reservoir of the system. Of course, this has advantages where the material that is stored lacks desired viscosity as a result of cooler temperatures or the like.

The secondary reservoir 10a or 10b can be any size and shape to match the properties, dispensing requirements, and thermal specifications of the end product. In this regard, it should be appreciated that the secondary reservoir 10a, 10b is, in at least one embodiment, formed of a material that is optically transparent or transmissive to the narrowband energy that is used to heat the contents of the reservoir. Along these lines, as will be described in greater detail below, the wavelength(s) at which the reservoir is transparent or transmissive is, in at least one form, different than the narrowband wavelength used to heat the contents of the reservoir (which wavelength, in at least one form, is desirably absorbed by the contents to achieve desired heating).

Traditional heating technologies have been unable to perform this type of targeted heating function due to their lack of focused thermal energy (heating only a small area) and their relatively slow response to changes in heat requirements. Digital heat injection technology (not shown in FIG. 1(a) or 1(b), but described below and in connection with FIGS. 2-4) can provide immediate, on-demand heat to accommodate the varying heat requirements that come with an uncertain dispensing schedule. Digital Heat Injection (DHI) technology, in at least one form of the presently described embodiments, may be implemented such that the narrowband wavelength irradiation or energy that is emitted from the narrowband devices or arrays of devices is selected or chosen to match at least one desired absorptive characteristic of the material that is being heated in the secondary reservoir. Also, as alluded to above, the narrowband wavelength irradiation or energy that is emitted from the narrowband devices or arrays of devices is selected or chosen to be optically transparent or transmissive to the secondary reservoir itself (i.e. the material that forms the reservoir). Narrowband devices that may be implemented could include a variety narrowband devices including any type of semiconductor narrowband irradiation devices, lasers, laser diodes, light emitting diodes, surface emitting laser diodes, surface emitting distributed feedback (SEDFB) laser diodes, VCSELs, and the like. Further, such devices could be implemented individually or in suitable array—to meet the objectives of the implementation. It should also be appreciated that any such devices will require direct current (DC), as opposed to alternating current. Accordingly, the system will require AC to DC conversion functionality to implement these embodiments if AC input is being used.

Figure 2:
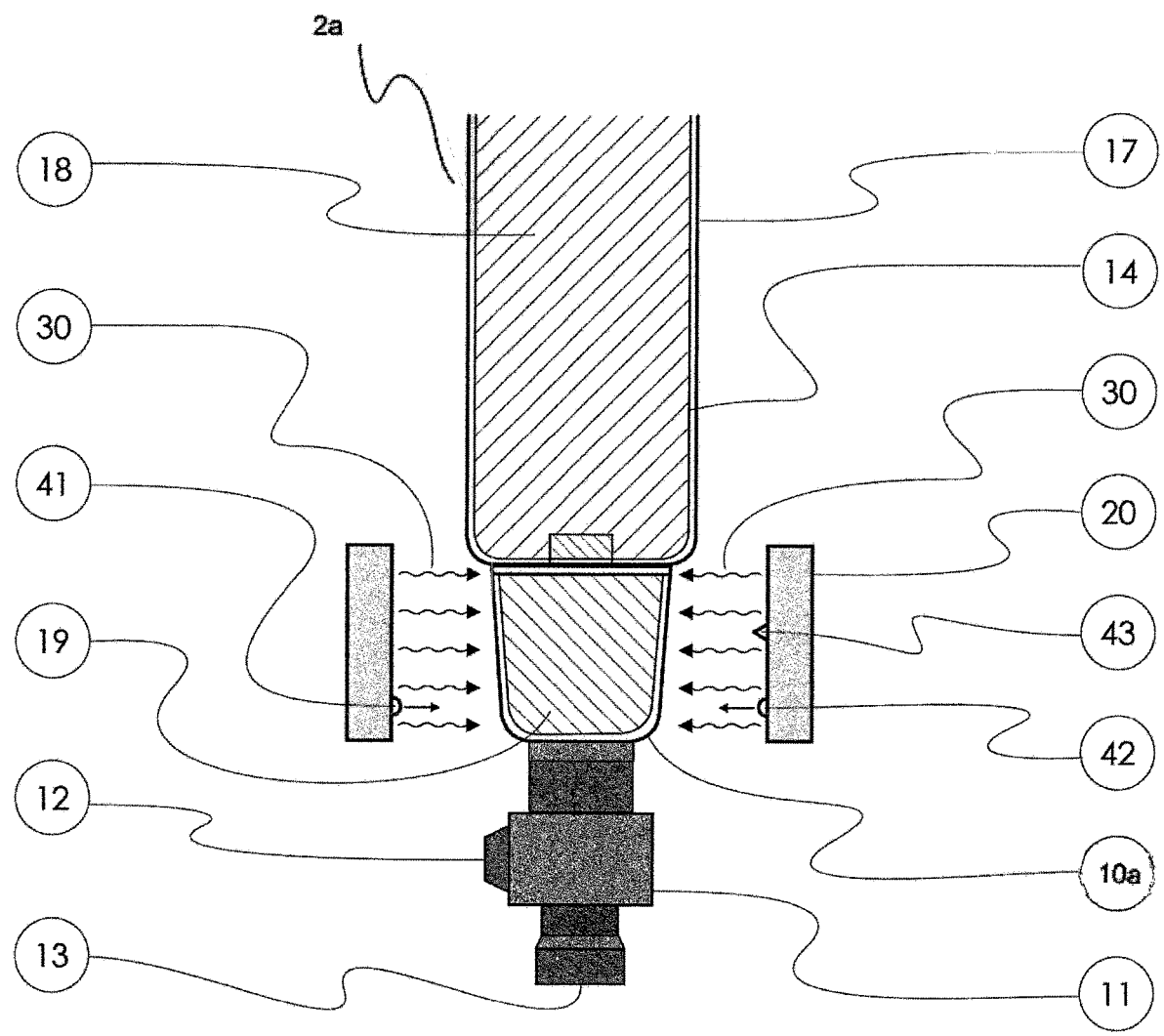
FIG. 2 shows an example dispensing unit with an irradiation source according to the presently described embodiments.

FIG. 2 is a view of the unit 2a of FIG. 1(a) including an irradiation source 20. The irradiation source 20 takes the form of a device(s) or array as described above. As shown, as product is dispensed from the smaller secondary dispensing reservoir 10a, additional, unheated product can be supplied from the larger primary reservoir 17. The cold product just transferred into in the secondary dispensing reservoir 10a can then be quickly brought up to dispensing temperature using the radiation source 20 which includes arrays of narrowband infrared emitters, as described. The contents are thus made ready to be dispensed prior to emptying the secondary reservoir of prepared product. The differences between the approaches are practically and substantially invisible to the end user. Substantial energy can be saved, which will vary from application to application, because only a small quantity of the product being dispensed (dispensant) is kept at dispensing temperature most of the time.

In at least one form of the presently described embodiments, heat is applied only to the secondary reservoir to achieve the objectives contemplated herein, including efficiency. The rapid response of digital heating facilitates makes this possible. In particular, the primary, large reservoir could be held at any temperature, including cooler temperatures to preserve the product until such time that it needs to be dispensed. This would reduce the effects of aging or spoilage in the large volume while still allowing the benefits of on-demand dispensing. The total output of the arrays would only have to be sized to accommodate the desired temperature change.

However, this application also could be implemented in circumstances such as outdoor or reduced temperature environments where the ambient temperature would otherwise cause the contents of the reservoirs, or dispensant, to become too viscous to flow properly such that the proper application of heat according to the presently described embodiments, would restore the correct viscosity to flow into the secondary dispensing cup area. In such a case, it is possible, if the application dictates a desirability, to have separate narrowband arrays irradiating all or a portion of the larger primary reservoir. A control system could monitor the product temperature with temperature sensors to determine if the product in the primary reservoir is at the right temperature for dispensing. It could then cycle the narrowband irradiation on and off to maintain the temperature and product viscosity at the desired level.

Figure 3:
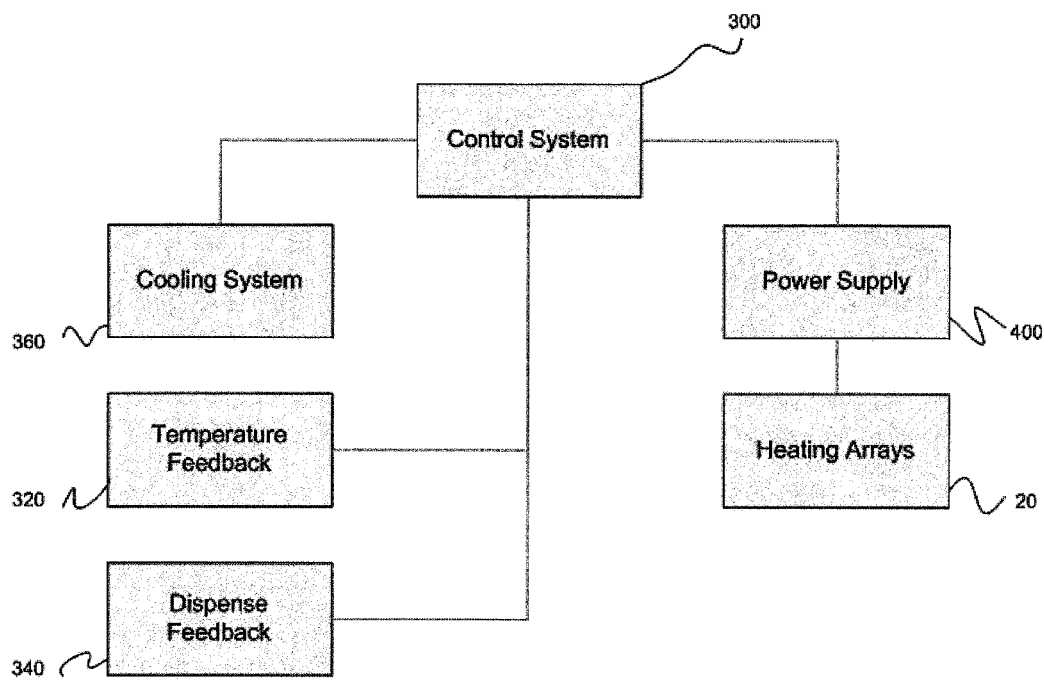
FIG. 3 shows a system diagram according to the presently described embodiments; and, FIG. 4 shows a system diagram according to the presently described embodiments.

With reference to FIG. 3, a control system or controller 300 could be relatively simple but will play a significant role in monitoring system functionality and system safety based on the output of suitable sensors disposed in the system. In this regard, a microcontroller or similar logic circuit could be used to monitor dispense cycles and trigger the arrays 20 when unheated product enters the secondary reservoir 10a or 10b using dispense feedback 340, trigger the arrays 20 for holding purposes when no dispensing cycles have occurred for a set amount of time or toggle a cooling system pump and/or a fan based cooling system for the utilization of the arrays 20. Optionally, such a controller could be configured to include temperature sensing and control of the arrays, presence or level detection of product in the secondary reservoir 10a or 10b using dispense feedback 340, temperature sensing and control of the product using temperature feedback 320, and temperature sensing and control of the cooling fluid. The control system will be configured, in at least one form of the presently described embodiments, to provide a user or operator with the ability to set and/or control the desired temperature of the material or foodstuff to be dispensed. In one form, levels or modes of operation (such as warm, warmer, and warmest) could be made available to users or operators through various techniques including manual or electronic buttons available on an interlace. A function to personalize or customize desired temperatures could also be implemented in such an interface. Additional functionality could be included in the controller 300 independent of the heating arrays to, for example, monitor dispensing frequency, volume and number of dispensing cycles remaining in the primary reservoir. Further, the control system could be used to monitor safety features of the system, such as those to be described in greater detail below, relating to safety interlock features included to ensure proper containment of irradiation.

Figure 4:
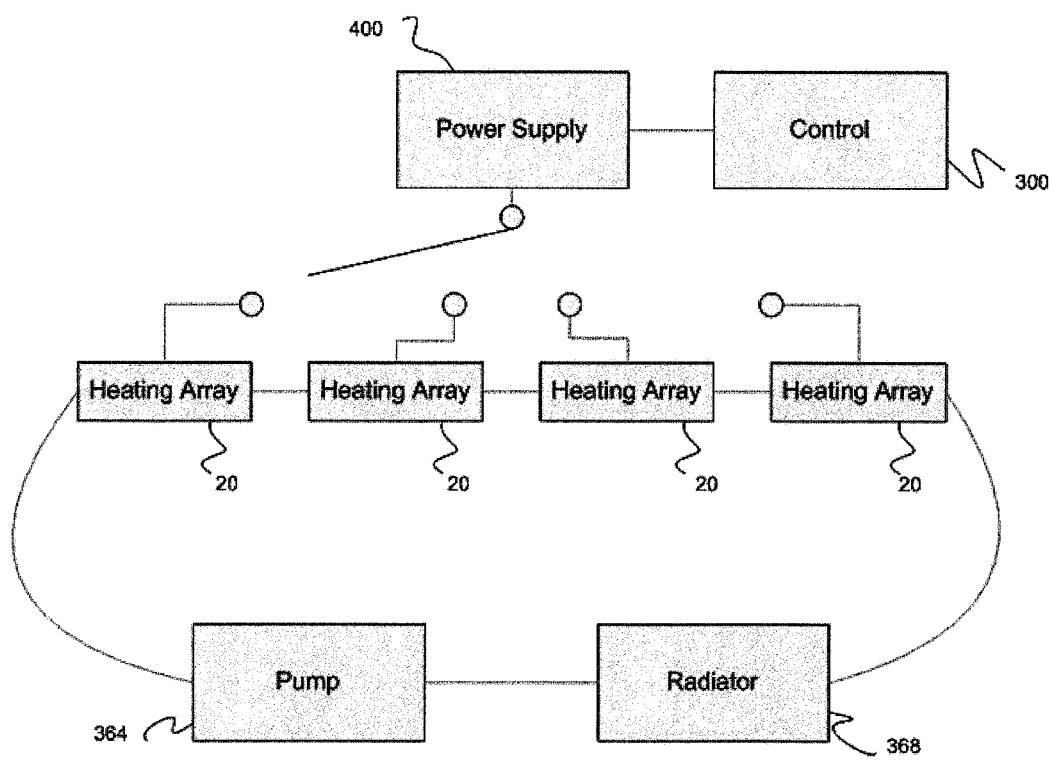

With reference to FIG. 4, in one example embodiment, the output of power supply 400 could be configured in a variety of manners. For example, the power supply could be routed to the individual arrays 20 and sized to supply full power to all of the arrays simultaneously. In a different embodiment, as representatively shown, due to the speed and precision of narrowband heating devices, the output of the power supply 400 could be routed to individual arrays 20 in sequence and only sized to power one array at a time. This would reduce the overall power requirement of the appliance and reduce cost without adversely effecting functionality. In each case, the power supply would be required to condition the incoming "wall plug" power (e.g. limit the current) for the specific current and voltage requirements of the narrowband heating arrays.

Also shown in FIG. 4 (and FIG. 3), an example radiator based water cooling system 360 could be used to maintain the operating temperature of the narrowband heating arrays 20. The low duty cycle of the individual arrays would result in an equally low cooling requirement. A cooling liquid (typically water) would be pumped using a pump 364 through the mounting plates of the narrowband heating arrays and passed through a forced air radiator 368 to remove the excess heat and transfer it to the surrounding air.

With reference back to FIG. 2, a method of dispensing heated material (e.g. a food stuff or viscous food stuff or other material) according to the presently described embodiments is as follows. A primary reservoir (17) is operatively attached to the heated dispensing module such that inlet tube 14 protrudes through the bottom of the container to provide an opening into the secondary reservoir 10 (a or b). A path is now open through the inlet tube 14 for the dispensant 18 to flow into the vessel 10 (a or b). There are many ways that inlet tube 14 can be shaped such that it breaks the seal on the bottom surface of the reservoir 17 and provides a non-leaking interface flow path into the reservoir 10. It is beyond the scope of this disclosure to describe the specifics as to the design and shape of the inlet tube 14 since many different styles of this type already exist. The important aspect here is that an open flow path be created from the primary reservoir 17 such that the dispensant 18 can flow into the dispensing assembly with a primarily gravity flow. Once the dispensant has flowed under gravity's force into the secondary reservoir 10b (or 10a), an end view of which is shown in FIG. 2, it is ready to be heated. In at least one form of the presently described embodiments, the entire assembly including the configuration shown in FIG. 2 and the control systems shown in FIGS. 3 & 4 are contained inside a cabinet.

The cabinet can certainly encompass a wide range of shapes and configurations but must protect people so they don't interface with any of the electrical circuits, and it must be completely opaque and sealed so that none of the infrared irradiation energy 30 can exit the cabinet at sufficient power density to become a safety issue. These objectives could be achieved in a variety of manners including complete sealing of the energy (or energy source) or using doors that must be closed as a condition of operation of the system. In such cases where a door is used, once any cabinet doors are closed and interlocked, the control board will turn on the output of the power supply thus actuating the array 20 to output its irradiation 30. It should be noted that the cabinet which encloses the assembly shown in FIG. 2 and the system shown diagrammatically in FIGS. 3 & 4 should be designed such that it totally encloses any radiation 30 such that it stays inside the cabinet. The cabinet material should be such that it is opaque to the irradiation wavelength 30 that is being employed in the system so that personnel and customers are not exposed to any high energy thermal radiant energy for safety reasons. Any doors or access panels should be designed so that they employ a tamper-proof interlock system, which could be either electrical or mechanical, in order to prevent the actuation of the heating arrays 20 without the cabinet being light-tight to the infrared energy. As a safety alternative, the arrays can be tightly shrouded to prevent the radiant energy from reaching humans or animals.

Upon triggering of the arrays 20 to generate energy directed at the secondary reservoir 10a or 10b, the irradiation 30 will pass through the wall of 10b and penetrate deeply into the liquid dispensant, thus absorbing the energy 30 which will cause the dispensant 19 to heat up accordingly. A temperature sensor which could either be imbedded in the array 20 or mounted separately, will be constantly monitoring the temperature of the secondary reservoir 10b and providing the control system with the information that it needs to turn the array 20 on and off as needed to maintain temperature. As an option, an optical sensor 41 & 42 will be constantly looking through the transparent walls of the secondary reservoir 10b to verify that there is liquid dispensant 19 in the dispensing cup to receive the narrowband radiant heat from the array 20 as needed. As an example, the sensors 41 and 42 could be level or fill level sensors. When the temperature sensor 43 confirms to the control system depicted in FIG. 3, that the dispensant is at the correct temperature for dispensing, then it will close a circuit allowing the actuation button to turn on the pump 12 upon customer demand. It should be appreciated that sensors including the optical and/or temperature sensors discussed above could be positioned at additional or alternative locations in the system as a specific implementation or application may dictate. Also, in some environments, an optical sensor might not be required. When the pump 12 has been actuated, then the dispensant will flow through the output nozzle 13 into the customer's cup or onto the food or any other location dictated by the system implementation for the material being dispensed. It is important in the design of at least one embodiment to recognize that the dispensant in the pump feeder tube 11 has not been directly heated by the irradiation array 20 since the radiant energy 30 is directed at the cup 10b above 11. Therefore, the dispensant in the tube 11 may not be heated except by conduction from the dispensant 19 which is actually in the cub 10b. The design should try to keep the length of the pump feeder tube 11 to the shortest length that works effectively with the kind of pump being employed 12 in the dispensing system. It is possible to locate an array which will directly irradiate the quantity of product that is resident in the tube 11 but the wall of the tube 11 must be reasonably transparent at the wavelength of radiant heat energy 30 which is being utilized.

While this patent teaching describes one way that this technology can be reduced to practice, there will be fundamentally a number of different ways that a dispensant can be transferred from a primary container or reservoir into a secondary reservoir where it is actually heated in preparation for warm dispensing. The dispensant could certainly be a range of different products including food, glues, silicones, and other viscous materials which would benefit from warm dispensing. One of skill in the art will recognize that there are many ways that the presently described embodiments can be applied and reduced to practice.

The invention claimed is:

1. A warm product dispensing system using narrowband irradiation as a primary heating source, the system comprising:
   a primary storage and supply reservoir for a dispensant;
   a secondary dispensing reservoir for the dispensant connected to the primary reservoir, the secondary reservoir having a smaller volume than the primary reservoir;
   narrowband irradiation devices or arrays of devices directed at the secondary reservoir and configured to emit irradiation at a narrow wavelength band that matches a desired absorption characteristic of the dispensant, wherein the secondary reservoir is formed of a material that is optically transmissive at the narrow wavelength band emitted toward the dispensant; and,
   a controller configured to control the system to heat the dispensant in the secondary reservoir.

2. The system as set forth in claim 1 wherein only the dispensant in the secondary reservoir is heated by emitted narrowband irradiation of the narrowband irradiation devices or arrays.

3. The system as set forth in claim 1 wherein the secondary reservoir includes an inlet and an outlet, wherein the inlet is larger than the outlet to allow flow of dispensant into the secondary reservoir from the primary reservoir.

4. The system as set forth in claim 1 further comprising a cooling system configured to provide cooling function to the narrowband irradiation devices or arrays.

5. The system as set forth in claim 1 further comprising sensors configured to provide information to the controller.

6. The system as set forth in claim 5 wherein the sensors comprise temperature sensors to detect temperature of the dispensant.

7. The system as set forth in claim 5 wherein the sensors comprise level sensors to detect a fill level of at least one of the secondary reservoir or the primary reservoir.

8. The system as set forth in claim 1 wherein the dispensant is a food stuff or a viscous food stuff.

9. The system as set forth in claim 1 wherein an interlock is used to ensure containment of irradiation.

10. The system as set forth in claim 1, wherein the narrowband irradiation devices or arrays of devices emit energy having a bandwidth less than 150 nanometers.

11. The system as set forth in claim 1, wherein the narrowband irradiation devices or arrays of devices emit energy having a bandwidth less than 15 nanometers.

12. A heating and control system for use with a volume of dispensant in a primary reservoir and a secondary reservoir for dispensing, the system comprising:
   narrowband irradiation devices or arrays of devices directed at the secondary reservoir and configured to emit irradiation at a narrow wavelength band that matches a desired absorption characteristic of the dispensant, wherein the secondary reservoir is formed of a material that is optically transmissive at the narrow wavelength band emitted toward the dispensant;

a controller configured to control heating of the dispensant using emitted narrow wavelength band irradiation to, at least one of, monitor dispense cycles, trigger the narrowband irradiation devices or arrays of devices when unheated dispensant enters the secondary reservoir, and trigger the narrowband irradiation device or arrays of devices for holding purposes when no dispensing cycles have occurred for an amount of time.

13. The system as set forth in claim 12 wherein only the dispensant in the secondary reservoir is heated by emitted narrowband irradiation of the narrowband irradiation devices or arrays.

14. The system as set forth in claim 12 wherein the controller is configured to control a cooling system configured to provide cooling function to the narrowband irradiation devices or arrays.

15. The system as set forth in claim 12 further comprising sensors configured to provide information to the controller.

16. The system as set forth in claim 15 wherein the sensors comprise temperature sensors to detect temperature of the dispensant.

17. The system as set forth in claim 15 wherein the sensors comprise level sensors to detect a fill level of at least one of the secondary reservoir or the primary reservoir.

18. The system as set forth in claim 12 wherein the dispensant is a food stuff or a viscous food stuff.

19. The system as set forth in claim 12, wherein the narrowband irradiation devices or arrays of devices emit energy having a bandwidth less than 150 nanometers.

20. The system as set forth in claim 12, wherein the narrowband irradiation devices or arrays of devices emit energy having a bandwidth less than 15 nanometers.

21. A method to be used where a volume of dispensant is divided into a primary reservoir and a secondary reservoir for dispensing the method comprising:

supplying dispensant from the primary reservoir to the secondary reservoir; and, heating the volume of material in the secondary reservoir for dispensing by emitting from narrowband irradiation devices or arrays of devices irradiation at a narrow wavelength band that matches a desired absorption characteristic of the dispensant, wherein the secondary reservoir is formed of a material that is optically transmissive at the narrow wavelength band emitted toward the dispensant.

22. The method as set forth in claim 21 wherein the heating is such that only the dispensant in the secondary reservoir is heated by emitted narrowband irradiation of the narrowband irradiation devices or arrays.

23. The method as set forth in claim 21 further comprising controlling a cooling function of the narrowband irradiation devices or arrays.

24. The method as set forth in claim 21 further comprising controlling based on sensors providing information to a controller.

25. The system as set forth in claim 24 wherein the sensors comprise temperature sensors to detect temperature of the dispensant.

26. The system as set forth in claim 24 wherein the sensors comprise level sensors to detect a fill level of at least one of the secondary reservoir or the primary reservoir.

27. The system as set forth in claim 21 wherein the dispensant is a food stuff or a viscous food stuff.

28. The method as set forth in claim 21, wherein the narrowband irradiation devices or arrays of devices emit energy having a bandwidth less than 150 nanometers.

29. The system as set forth in claim 21, wherein the narrowband irradiation devices or arrays of devices emit energy having a bandwidth less than 15 nanometers.

* * * * *